(12) United States Patent
Harber et al.

(10) Patent No.: US 9,554,258 B2
(45) Date of Patent: Jan. 24, 2017

(54) SYSTEM FOR DYNAMIC CONTENT RECOMMENDATION USING SOCIAL NETWORK DATA

(71) Applicant: TOYOTA JIDOSHA KABUSHIKI KAISHA, Toyota-shi, Aichi-ken (JP)

(72) Inventors: Dustin Harber, San Ramon, CA (US); Vinuth Rai, Mountain View, CA (US); Roger D. Melen, Los Altos Hills, CA (US)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 491 days.

(21) Appl. No.: 14/244,861

(22) Filed: Apr. 3, 2014

(65) Prior Publication Data

US 2015/0289120 A1     Oct. 8, 2015

(51) Int. Cl.
| | |
|---|---|
| *G06Q 30/02* | (2012.01) |
| *H04W 4/18* | (2009.01) |
| *H04L 29/08* | (2006.01) |
| *G06Q 50/00* | (2012.01) |

(52) U.S. Cl.
CPC .............. *H04W 4/18* (2013.01); *G06Q 50/01* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 8,306,921 | B2* | 11/2012 | Kalik ..................... | G01C 21/30 705/319 |
| 8,645,366 | B1* | 2/2014 | Acharya ............. | G06F 17/3087 707/723 |
| 8,886,625 | B1* | 11/2014 | Dorner .............. | G06F 17/30029 707/705 |
| 8,972,368 | B1* | 3/2015 | de Sousa .......... | G06F 17/30477 707/705 |
| 9,007,234 | B2* | 4/2015 | Ozaki ................ | G01C 21/3694 340/905 |
| 9,009,088 | B2* | 4/2015 | Wilson ................... | G06N 3/063 706/15 |
| 9,129,225 | B2* | 9/2015 | Sathish ............. | G06F 17/30873 |
| 9,172,762 | B2* | 10/2015 | Ruffner ............. | G06F 17/30873 |
| 9,183,259 | B1* | 11/2015 | Marra ................. | G06F 17/3053 |
| 9,239,865 | B1* | 1/2016 | Balez ..................... | G06Q 50/01 |

(Continued)

*Primary Examiner* — Jonathan M Dager
(74) *Attorney, Agent, or Firm* — Patent Law Works LLP

(57) ABSTRACT

A system or method for providing recommended items for presentation to users and/or consideration by vehicle systems may be executable to: retrieve social network data associated with a user; extract a keyword and/or a key phrase from the social network data; and determine a preference model that includes a frequency analysis associated with the keyword and/or the key phrase and indicating how often the keyword and/or the key phrase are observed in the social network data. The system may further receive a request for content data; search a content database to retrieve one or more content items based on the frequency analysis associated with the preference model; generate one or more recommended items for the user or for a vehicle system from the one or more content items; and provide the one or more recommended items for presentation to the user or for processing by the vehicle system.

24 Claims, 10 Drawing Sheets

(56) References Cited

U.S. PATENT DOCUMENTS

| | | | |
|---|---|---|---|
| 9,247,015 B2* | 1/2016 | Ruffner | |
| 9,389,095 B2* | 7/2016 | Li | G01C 21/3679 |
| 2007/0129880 A1* | 6/2007 | Thacher | G01C 21/26 |
| | | | 701/533 |
| 2008/0134053 A1* | 6/2008 | Fischer | G06Q 10/02 |
| | | | 715/747 |
| 2008/0234929 A1* | 9/2008 | Watson | G01C 21/00 |
| | | | 701/408 |
| 2009/0006194 A1* | 1/2009 | Sridharan | G06Q 30/02 |
| | | | 705/14.62 |
| 2009/0281719 A1* | 11/2009 | Jakobson | G01C 21/3682 |
| | | | 701/439 |
| 2010/0174709 A1* | 7/2010 | Hansen | G06F 17/3087 |
| | | | 707/728 |
| 2010/0262658 A1* | 10/2010 | Mesnage | G06Q 10/06 |
| | | | 709/204 |
| 2010/0312644 A1* | 12/2010 | Borgs | G06Q 10/10 |
| | | | 705/14.55 |
| 2011/0035329 A1* | 2/2011 | Delli Santi | G06Q 30/02 |
| | | | 705/347 |
| 2011/0264370 A1* | 10/2011 | Jakobson | G01C 21/3682 |
| | | | 701/533 |
| 2012/0078916 A1* | 3/2012 | Tseng | G06F 17/30867 |
| | | | 707/748 |
| 2012/0290405 A1* | 11/2012 | Talluri | G06F 21/51 |
| | | | 705/14.69 |
| 2013/0031106 A1* | 1/2013 | Schechter | G06F 17/3064 |
| | | | 707/749 |
| 2013/0111354 A1* | 5/2013 | Marra | G06Q 50/01 |
| | | | 715/751 |
| 2015/0120722 A1* | 4/2015 | Martín Martínez | G06F 17/30867 |
| | | | 707/733 |
| 2016/0255170 A1* | 9/2016 | Gargi | H04L 67/306 |

\* cited by examiner

SYSTEM FOR DYNAMIC CONTENT RECOMMENDATION USING SOCIAL NETWORK DATA

BACKGROUND

The specification relates to recommending content data.

A user can access numerous online content items (e.g., video items, audio items, etc.) from various content providers. However, the user needs to manually search for content items that he or she is interested in from the various content providers. It is difficult for the user to manually find out the relevant content items from the numerous online content items in a timely manner.

SUMMARY

According to one innovative aspect of the subject matter described in this disclosure, a system for providing recommended items for presentation to users and/or consideration by vehicle systems includes one or more processors and one or more memories storing instructions that, when executed, cause the system to: retrieve social network data associated with a user; extract one or more of a keyword and a key phrase from the social network data; determine a preference model that includes a frequency analysis associated with the one or more of the keyword and the key phrase, the frequency analysis indicating how often the one or more of the keyword and the key phrase are observed in the social network data; receive a request for content data; search a content database to retrieve one or more content items based on the frequency analysis associated with the preference model; generate one or more recommended items for the user or for a vehicle system from the one or more content items; and provide the one or more recommended items for presentation to the user or for processing by the vehicle system.

In general, another innovative aspect of the subject matter described in this disclosure may be embodied in methods that include: retrieving social network data associated with a user; extracting one or more of the keyword and the key phrase from the social network data; determining a preference model that includes a frequency analysis associated with the one or more of the keyword and the key phrase, the frequency analysis indicating how often the one or more of the keyword and the key phrase are observed in the social network data; receiving a request for content data; searching a content database to retrieve one or more content items based on the frequency analysis associated with the preference model; generating one or more recommended items for the user or for a vehicle system from the one or more content items; and providing the one or more recommended items for presentation to the user or processing by the vehicle system.

Other aspects include corresponding methods, systems, apparatus, and computer program products for these and other innovative aspects.

These and other implementations may each optionally include one or more of the following features. For instance, the operations include receiving feedback data describing one or more user interactions with the one or more recommended items; and refining the preference model based on the feedback data. For instance, the features include: determining, based on the frequency analysis, one or more of a featured keyword and a featured key phrase from the preference model; searching the content database to retrieve the one or more content items that match at least one of the one or more of the featured keyword and the featured key phrase; that the one or more of the featured keyword and the featured key phrase are associated with one or more latest timestamps; that the one or more of the featured keyword and the featured key phrase are associated with one or more highest total observation frequencies; that the one or more of the featured keyword and the featured key phrase are associated with one or more upward frequency trends; that the one or more recommended items include one or more of a modified maximum speed and an estimated destination established travel route; and that the frequency analysis describes one or more of an observation frequency within a time period for each of the one or more of the keyword and the key phrase that are extracted from the social network data, a total observation frequency for each of the one or more of the keyword and the key phrase that are extracted from the social network data, and a frequency trend for each of the one or more of the keyword and the key phrase that are extracted from the social network data.

The present disclosure may be particularly advantageous in a number of respects. First, the system is capable of automatically learning a user's preference model by: (1) monitoring the user's social network data upon the consent of the user; (2) extracting keywords or key phrases from the user's social network data; and (3) creating a preference model for the user based on the extracted keywords or key phrases. Second, the system provides a better user experience by automatically providing content items to a user in a timely manner, which saves the user's time on the content selection. For example, the system can automatically provide near real-time audio content items to a driver driving a vehicle, so that the driver does not need to select the audio content items manually. In another example, the content items provided to a user are prerecorded content items, allowing the user to access the content items at any time rather than at a scheduled live air time. The system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Overview

Figure 1:
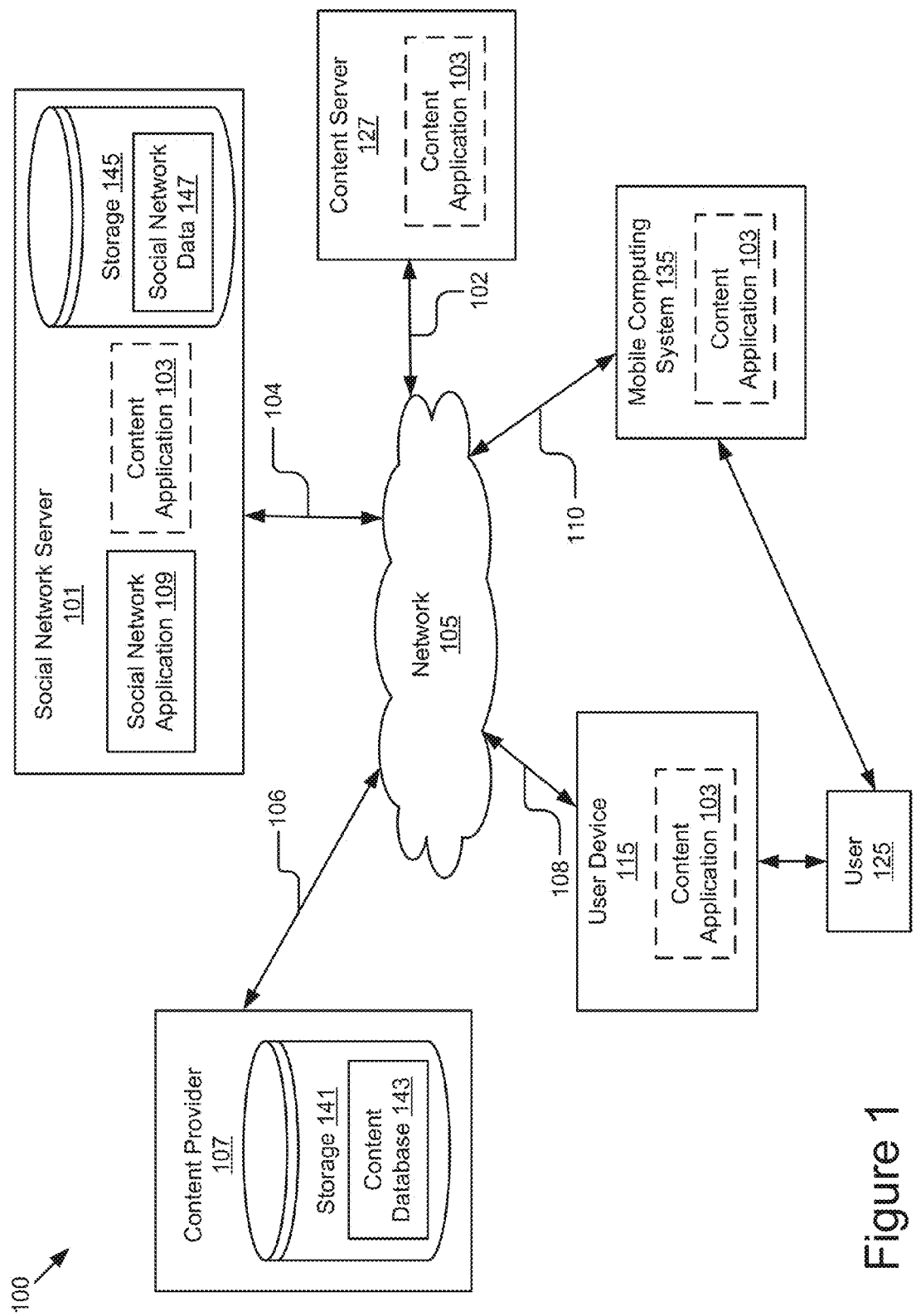
FIG. 1 is a block diagram illustrating an example system for providing recommended content items to a user or a vehicle system.

FIG. 1 illustrates a block diagram of some implementations of a system 100 for providing recommended items to a user or a vehicle system. The illustrated system 100 includes a user device 115 that can be accessed by a user 125, a social network server 101, a content provider 107, a content server 127 and a mobile computing system 135 that can be accessed by the user 125. In some embodiments, the system 100 may include other entities not shown in FIG. 1 including a web server, an email server, etc. In the illustrated implementation, these entities of the system 100 are communicatively coupled via a network 105.

While FIG. 1 illustrates one user device 115, one mobile computing system 135, one social network server 101, one content provider 107 and one content server 127, the present disclosure applies to a system architecture having one or more user devices 115, one or more mobile computing systems 135, one or more content servers 127, one or more social network servers 101 and one or more content providers 107. Furthermore, although FIG. 1 illustrates one network 105 coupled to the user device 115, the social network server 101, the content provider 107, the mobile computing system 135 and the content server 127, in practice one or more networks 105 can be connected to these entities.

In some implementations, the content provider 107 can be a hardware server that includes a processor, a memory and network communication capabilities. The content provider 107 sends and receives data to and from other entities of the system 100 via the network 105. The content provider 107 is communicatively coupled to the network 105 via signal line 106. In the illustrated embodiment, the content provider 107 includes a storage device 141.

The storage device 141 can be a non-transitory memory that stores data for providing the functionality described herein. The storage device 141 may be a dynamic random access memory (DRAM) device, a static random access memory (SRAM) device, flash memory or some other memory devices. In some implementations, the storage device 141 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation, the storage device 141 includes a content database 143. The content database 143 stores a collection of content data describing one or more content items. For example, the content database 143 is a searchable online podcast database. Example content items include, but are not limited to, an audio file (e.g., a music audio clip, a podcast, an audio book, audio news, radio programs, traffic announcements, weather forecast, etc.), a video file (e.g., a music video, a movie, a TV program, a news video or any other video), an image, a text file, articles, posts, events, news feeds, etc. Other example content items are possible. In one embodiment, the content items are prerecorded content items. In another embodiment, the content items are live content items.

In some implementations, the content application 103 can be operable on the social network server 101, which is coupled to the network 105 via signal line 104. The social network server 101 can be a hardware server that includes a processor, a memory and network communication capabilities. In some implementations, the social network server 101 sends and receives data to and from one or more of the user device 115, the content server 127, the mobile computing system 135 and the content provider 107 via the network 105. The social network server 101 includes a social network application 109 and a storage device 145. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus.

In some implementations, the content application 103 can be stored on the content server 127, which is connected to the network 105 via signal line 102. In some implementations, the content server 127 can be a hardware server that includes a processor, a memory and network communication capabilities. The content server 127 sends and receives data to and from other entities of the system 100 via the network 105. For example, the content server 127 receives data describing one or more content items from the content provider 107. In another example, the content server 127 sends recommended content items to the user device 115 or the mobile computing system 135 for presentation to the user 125.

In some implementations, the content application 103 can be stored on a user device 115, which is connected to the network 105 via signal line 108. In some implementations, the user device 115 may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. In the illustrated implementation, the user 125 interacts with the user device 115. In some implementations, the content application 103 acts in part as a thin-client application that may be stored on the user device 115 and in part as components that may be stored on one or more of the social network server 101, the mobile computing system 135 and the content server 127.

In some implementations, the content application 103 can be stored on a mobile computing system 135, which is connected to the network 105 via signal line 110. In some implementations, the mobile computing system 135 is any computing system that includes a memory and a processor, for example a laptop computer, a tablet computer, a mobile telephone, a personal digital assistant (PDA), a mobile email device, a portable game player, a portable music player, a television with one or more processors embedded therein or coupled thereto or any other mobile electronic system capable of accessing a network 105. In one embodiment, the mobile computing system 135 is one of a vehicle, an automobile, a bus, a bionic implant or any other mobile system with non-transitory computer electronics (e.g., a processor, a memory or any combination of non-transitory computer electronics). For instance, the mobile computing system 135 may include a vehicle system, such as a car, a plane, a boat, a bicycle, or other transportation system.

The content application 103 can be code and routines for providing recommended content items to a user or a vehicle system. In some implementations, the content application 103 can be implemented using hardware including a field-programmable gate array (FPGA) or an application-specific integrated circuit (ASIC). In some other implementations, the content application 103 can be implemented using a combination of hardware and software. In some implementations, the content application 103 may be stored in a combination of the devices and servers, or in one of the devices or servers. The content application 103 is described below in more detail with reference to FIGS. 2-4B.

The storage device 145 has similar structure and provides similar functionality as those described above for the storage device 141, and the description will not be repeated here. In the illustrated embodiment, the storage device 145 stores social network data 147. The social network data 147 is any data related to a social network. For example, the social network data 147 includes one or more of posts, comments, endorsements, shares, etc., published by a user in a social network. In another example, the social network data 147 includes data describing a user profile associated with a user (e.g., a user name, a gender, education background, working experience, interests, hobbies, demographic information, etc.), one or more news feeds subscribed by a user, a social feed associated with a user, one or more topics subscribed by a user, one or more communities participated by a user and one or more calendar events associated with a user, etc.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Content Application

Figure 2:
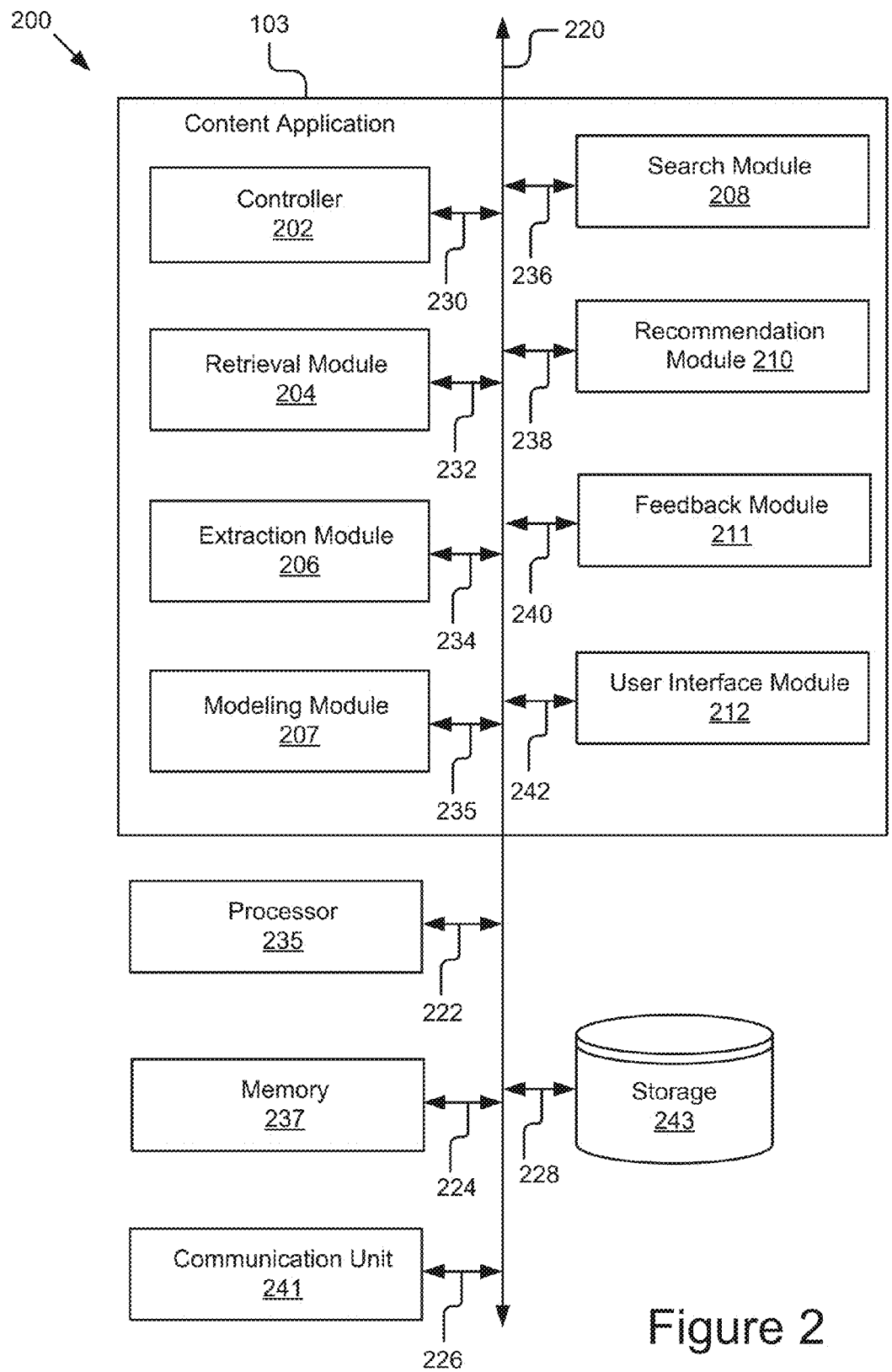
FIG. 2 is a block diagram illustrating an example of a content application.

Referring now to FIG. 2, an example of the content application 103 is shown in more detail. FIG. 2 is a block diagram of a computing device 200 that includes a content application 103, a processor 235, a memory 237, a communication unit 241 and a storage device 243 according to some examples. The components of the computing device 200 are communicatively coupled by a bus 220. In some implementations, the computing device 200 can be one of a social network server 101, a user device 115, a content server 127, and a mobile computing system 135.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the user device 115, the content provider 107, the content server 127, the mobile computing system 135, and the social network server 101 depending upon where the content application 103 is stored. The communication unit 241 is coupled to the bus 220 via signal line 226. In some implementations, the communication unit 241 includes a port for direct physical connection to the network 105 or to another communication channel. For example, the communication unit 241 includes a USB, SD, CAT-5 or similar port for wired communication with the user device 115. In some implementations, the communication unit 241 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 243 has similar structure and provides similar functionality as those described above for the storage device 141, and the description will not be repeated here. In the illustrated implementation, the storage device 243 is communicatively coupled to the bus 220 via signal line 228. In some implementations, the storage device 243 stores one or more of: data describing a preference model associated with a user; feedback data received from a user; and data describing one or more recommended items generated for a user or a vehicle system. The preference model and the feedback data are described below in more detail. In some implementations, the storage device 243 may store other data for providing the functionality described herein.

In the illustrated implementation shown in FIG. 2, the content application 103 includes a controller 202, a retrieval module 204, an extraction module 206, a modeling module 207, a search module 208, a recommendation module 210, a feedback module 211, and a user interface module 212.

These components of the content application 103 are communicatively coupled to each other via the bus 220.

The controller 202 can be software including routines for handling communications between the content application 103 and other components of the computing device 200. In some implementations, the controller 202 can be a set of instructions executable by the processor 235 to provide the functionality described below for handling communications between the content application 103 and other components of the computing device 200. In some implementations, the controller 202 can be stored in the memory 237 of the computing device 200 and can be accessible and executable by the processor 235. The controller 202 may be adapted for cooperation and communication with the processor 235 and other components of the computing device 200 via signal line 230.

The controller 202 sends and receives data, via the communication unit 241, to and from one or more of a user device 115, a content server 127, a social network server 101, a mobile computing system 135, and a content provider 107. For example, the controller 202 receives, via the communication unit 241, feedback data associated with a recommended item from a user device 115 and sends the data to the feedback module 211. In another example, the controller 202 receives graphical data for providing a user interface to a user from the user interface module 212 and sends the graphical data to a user device 115, causing the user device 115 to present the user interface to the user.

In some implementations, the controller 202 receives data from other components of the content application 103 and stores the data in the storage device 243. For example, the controller 202 receives graphical data from the user interface module 212 and stores the graphical data in the storage device 243. In some implementations, the controller 202 retrieves data from the storage device 243 and sends the retrieved data to other components of the content application 103. For example, the controller 202 retrieves data describing a preference model associated with a user from the storage 243 and sends the data to the search module 208.

The retrieval module 204 can be software including routines for retrieving social network data associated with a user. In some implementations, the retrieval module 204 can be a set of instructions executable by the processor 235 to provide the functionality described below for retrieving social network data associated with a user. In some implementations, the retrieval module 204 can be stored in the memory 237 of the computing device 200 and can be accessible and executable by the processor 235. The retrieval module 204 may be adapted for cooperation and communication with the processor 235 and other components of the computing device 200 via signal line 232.

In one embodiment, the retrieval module 204 receives a user's login credential (e.g., a user name, a password) associated with a social network account from the user. The retrieval module 204 uses the user's login credential to retrieve social network data associated with the user from the social network server 101. In some instances, the retrieval module 204 retrieves the user's social network data from the social network server 101 in real time. For example, the retrieval module 204 monitors the user's social network account with the consent of the user and retrieves any new social network data related to the user from the social network server 101 in real time. In some instances, the retrieval module 204 retrieves the user's social network data from the social network server 101 according to a predetermined time interval. For example, the retrieval module 204 retrieves the user's social network data from the social network server 101 every 24 hours.

In one embodiment, the social network data associated with the user includes one or more of: (1) posts, comments, endorsements, shares, etc., published by the user in the social network; (2) a user profile associated with the user (e.g., interests, hobbies, education background, working experience, demographic information, etc.); (3) communities, news feeds, topics, etc., subscribed by the user; (4) a social feed associated with the user; (5) calendar events associated with the user; (6) posts, comments, endorsements, shares, etc., published by another user that is connected to the user in the social graph (e.g., friends' posts, comments, etc.); (7) a public user profile associated with another user that is connected to the user in the social graph; (8) communities, news feeds, topics, etc., subscribed by another user that is connected to the user in the social graph; (9) a social feed associated with another user that is connected to the user in the social graph; and (10) calendar events associated with another user that is connected to the user in the social graph. The social network data may include other data retrieved from the social network server 101 with the consent of related users.

In one embodiment, the retrieval module 204 stores the retrieved social network data related to the user in the storage 243. In another embodiment, the retrieval module 204 sends the retrieved social network data to the extraction module 206.

The extraction module 206 can be software including routines for extracting one or more keywords and/or key phrases. In some implementations, the extraction module 206 can be a set of instructions executable by the processor 235 to provide the functionality described below for extracting one or more keywords and/or key phrases. In some implementations, the extraction module 206 can be stored in the memory 237 of the computing device 200 and can be accessible and executable by the processor 235. The extraction module 206 may be adapted for cooperation and communication with the processor 235 and other components of the computing device 200 via signal line 234.

In one embodiment, the extraction module 206 receives social network data associated with a user from the retrieval module 204. The extraction module 206 parses the social network data to extract one or more keywords and/or key phrases relevant to the user from the social network data. For example, the extraction module 206 parses one or more posts and/or endorsements described by the social network data, and extracts one or more keywords and/or key phrases from the posts and/or endorsements. In another example, assume the social network data indicates the user has published a post describing a radio talk show. The extraction module 206 parses the social network data and extracts keywords and/or key phrases related to the radio talk show including a title of the radio talk show, a host of the radio talk show, a radio station that broadcasts the radio talk show, etc.

In some implementations, the extraction module 206 applies natural language processing methods to extract one or more keywords and/or key phrases from the social network data. For example, the extraction module 206 applies natural language processing methods to eliminate contentless stop words and parse the social network data for nouns or noun phrases that represent the content described by the social network data. Example stop words include, but are not limited to, articles and prepositions, etc.

In one embodiment, an extracted keyword and/or key phrase describes a topic, an event, a program, an album, an artist, a celebrity or any other item that the user is interested in. For example, an extracted keyword and/or key phrase describe one of a natural disaster, an ongoing political campaign and a series of podcasts related to a particular topic, etc. In one embodiment, an extracted keyword and/or key phrase describes an interest, a hobby, a habit, a plan (e.g., a vacation plan) or a personal preference associated with the user. Other example keywords and key phrases are possible.

In some embodiments, a software agent (e.g., content application 103) running on an on-board automated safety system, such as the mobile computing system 135, may send requests and receive recommendations of route and maximum speed based on word or phrase frequency analysis of social network data. This analysis may result in recommendations of modified maximum speed and route such as those which may be due to the impact of social gatherings inferred from social network data. Various non-limiting examples of these types of recommendations are depicted and described with reference to at least FIGS. 7A and 7B.

In one embodiment, the extraction module 206 stores the one or more extracted keywords and/or key phrases in the storage 243. In another embodiment, the extraction module 206 sends the one or more extracted keywords and/or key phrases to the modeling module 207.

The modeling module 207 can be software including routines for creating a preference model associated with a user. In some implementations, the modeling module 207 can be a set of instructions executable by the processor 235 to provide the functionality described below for creating a preference model associated with a user. In some implementations, the modeling module 207 can be stored in the memory 237 of the computing device 200 and can be accessible and executable by the processor 235. The modeling module 207 may be adapted for cooperation and communication with the processor 235 and other components of the computing device 200 via signal line 235.

In one embodiment, the modeling module 207 receives one or more keywords and/or key phrases from the extraction module 205. The modeling module 207 creates a preference model for the user using the one or more keywords and/or key phrases. A preference model is data indicating one or more user preferences for selecting content data. For example, a preference model indicates a user likes content items related to a first keyword and dislikes content items related to a second keyword. In one embodiment, a preference model includes a frequency analysis associated with one or more keywords and/or key phrases. A frequency analysis is an analysis indicating how often one or more keywords and/or key phrases are observed in the social network data. For example, a frequency analysis includes an observation frequency for each keyword and/or a key phrase, a total observation frequency for each keyword and/or a key phrase, and a frequency trend for each keyword and/or a key phrase.

An observation frequency associated with a keyword and/or a key phrase within a time period is data describing how often the keyword and/or key phrase is observed within the time period. For example, an observation frequency for a keyword in a particular week indicates that the keyword has been extracted 20 times from the user's social network data in the particular week. In one embodiment, an observation frequency is one of a daily observation frequency, a weekly observation frequency, a monthly observation frequency or any other observation frequency associated with a particular time interval.

A total observation frequency associated with a keyword and/or key phrase is data describing a total number of times that the keyword and/or key phrase is observed. For example, a total observation frequency for a keyword and/or key phrase describes that the keyword and/or key phrase has been observed 54 times based on all the social network data associated with the user (including the user's historic social network data and current social network data). In one embodiment, a total observation frequency for a keyword and/or key phrase is a sum of all the observation frequencies for the keyword and/or key phrase at the non-overlapped time periods.

Figure 6A:
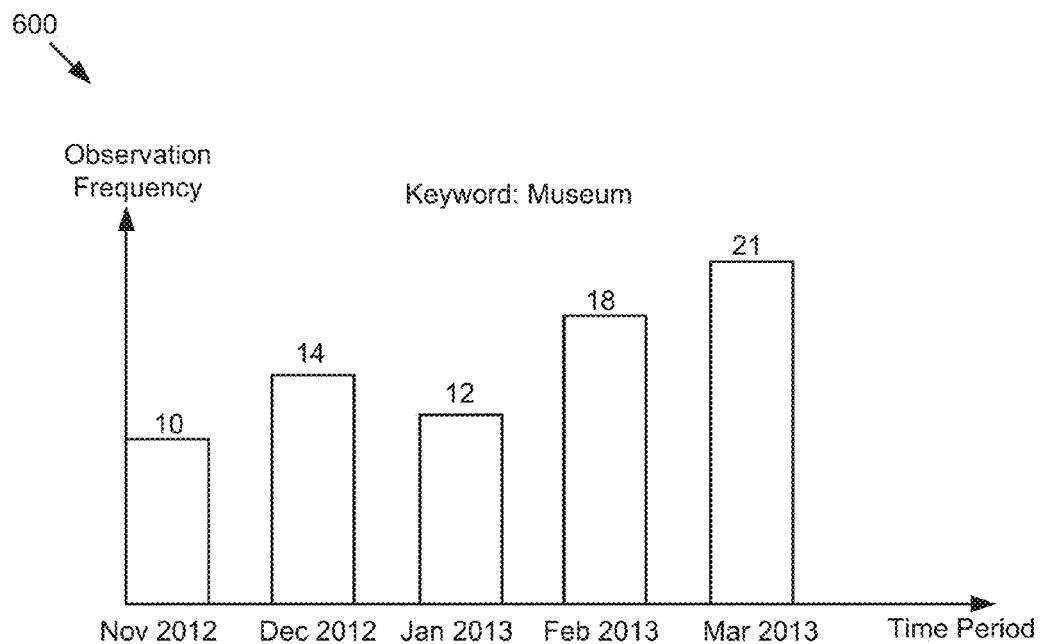
FIGS. 6A-6C are graphic representations illustrating various frequency trends for various keywords or key phrases according to some embodiments.
Figure 6B:
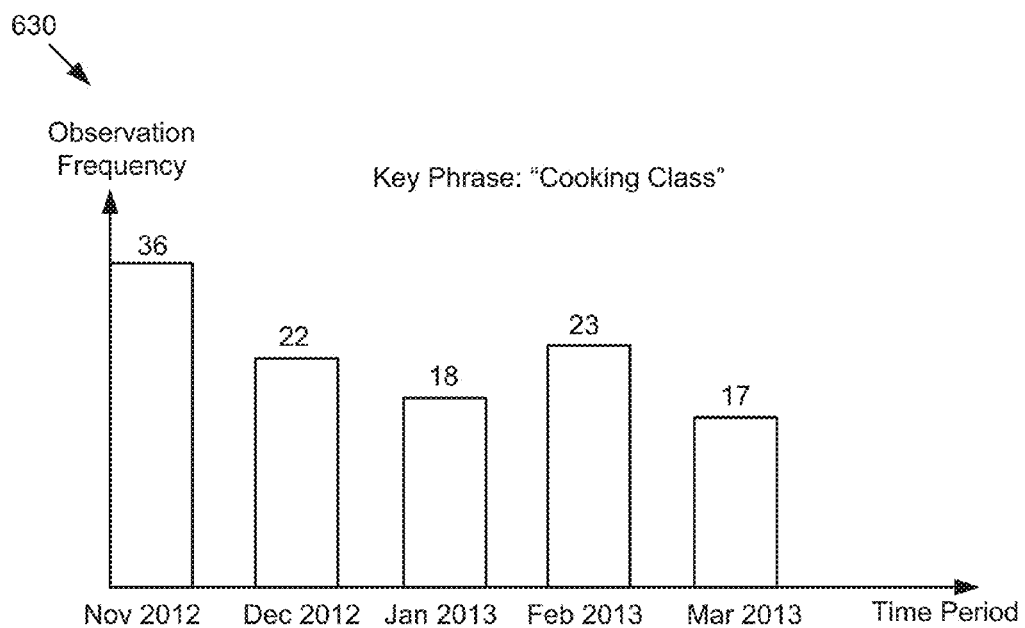
Figure 6C:
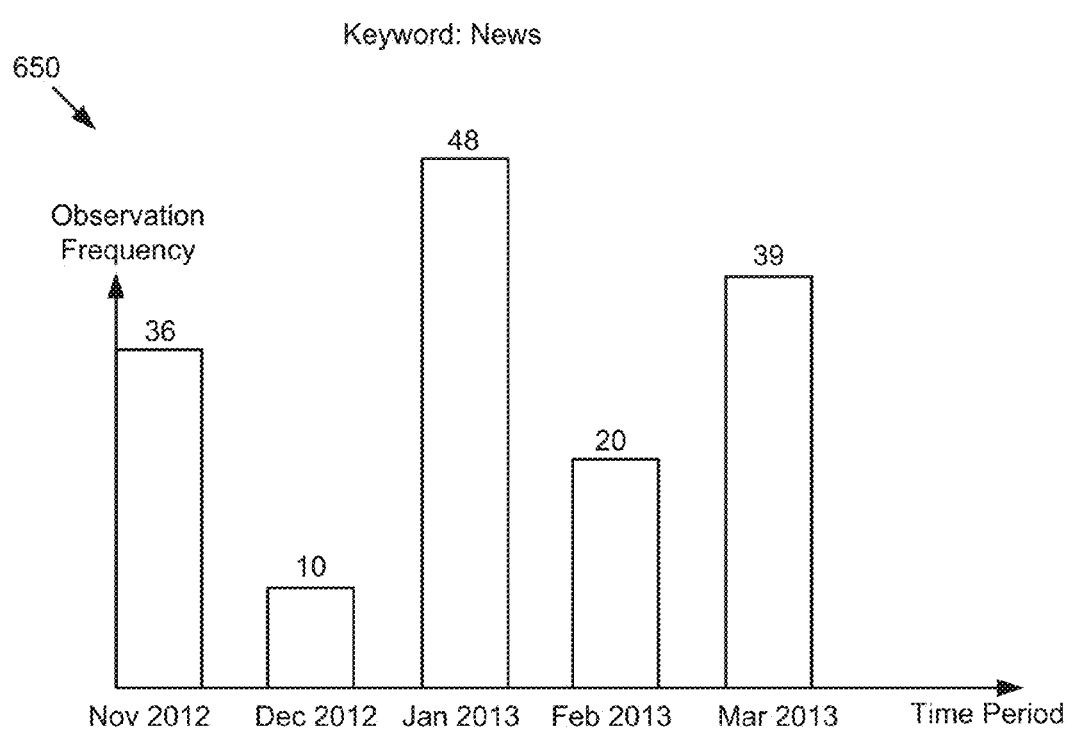

A frequency trend associated with a keyword and/or key phrase is data describing a trend of an observation frequency of the keyword and/or key phrase. For example, a frequency trend for a keyword and/or key phrase can be one of an upward frequency trend, a downward frequency trend and a fluctuant frequency trend, etc. In some examples, an upward frequency trend of a keyword and/or key phrase indicates that an observation frequency of the keyword and/or key phrase has a tendency to increase when compared to corresponding previous observation frequencies; a downward frequency trend of a keyword and/or key phrase indicates that an observation frequency of the keyword and/or key phrase has a tendency to decrease when compared to corresponding previous observation frequencies; and a fluctuant frequency trend of a keyword and/or key phrase indicates that an observation frequency of the keyword and/or key phrase fluctuates when compared to corresponding previous observation frequencies (e.g., having a tendency shifting back and forth uncertainly). Example frequency trends are illustrated in FIGS. 6A-6C.

Figure 5:
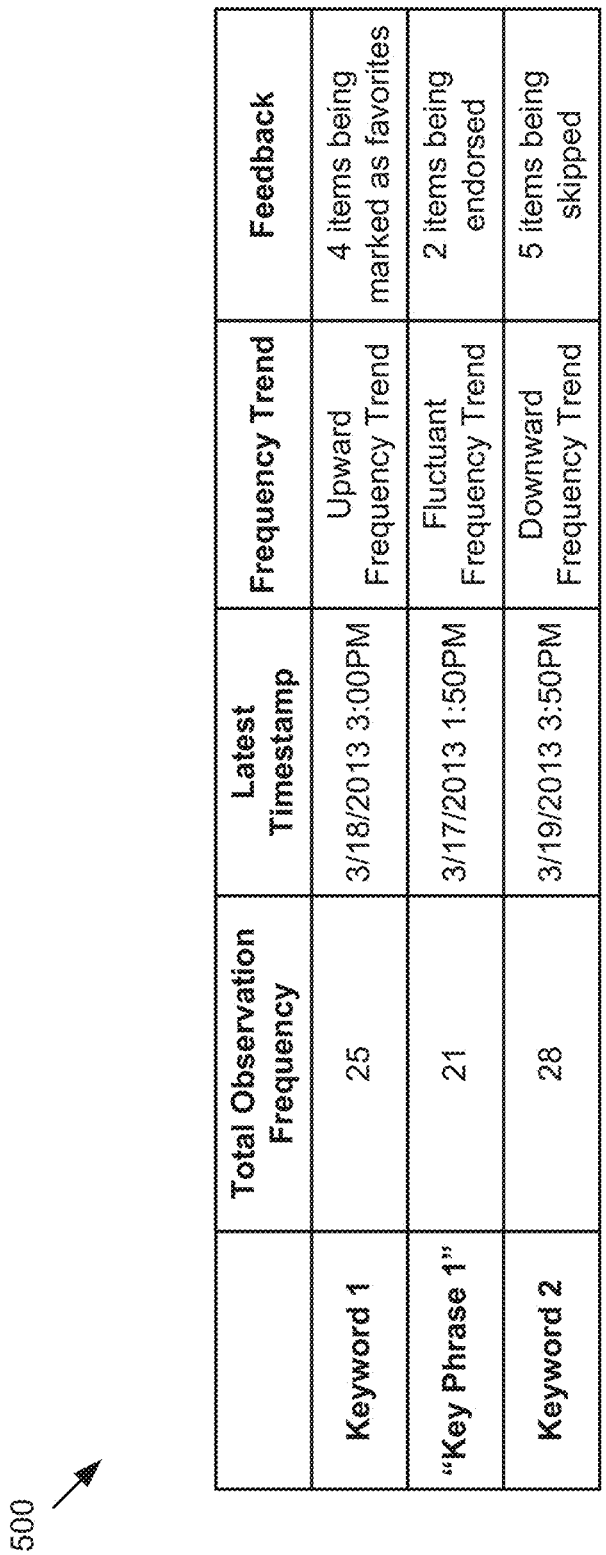
FIG. 5 is a graphic representation illustrating data included in an example preference model according to one embodiment.

In one embodiment, a preference model includes one or more of: (1) one or more keywords and/or key phrases; (2) an observation frequency within a time period for each keyword and/or key phrase; (3) a total observation frequency for each keyword and/or key phrase; (4) a latest timestamp for each keyword and/or key phrase; (5) a frequency trend for each keyword and/or key phrase; (6) feedback data associated with each keyword and/or key phrase; (7) a link to all timestamps for each keyword and/or key phrase; and (8) a link to content items associated with the keyword, key phrase, etc. An example preference model is illustrated in FIG. 5. A timestamp for a keyword and/or a key phrase is data describing a time that the keyword and/or key phrase is extracted from the social network data. The feedback data is described below in more detail. In some embodiments, the preference model may include other data associated with each keyword and/or key phrase.

In one embodiment, the modeling module 207 stores data included in the preference model in a matrix. For example, the modeling module 207 stores each keyword and/or key phrase, a total observation frequency for each keyword and/or key phrase, and a latest timestamp for each keyword and/or key phrase in a matrix.

In one embodiment, the modeling module 207 determines two or more observation frequencies of a keyword and/or key phrase at two or more non-overlapped time periods. The modeling module 207 determines a frequency trend for the keyword and/or key phrase based on the two or more observation frequencies. For example, the modeling module 207 determines that: (1) a first monthly observation frequency of a keyword in December 2012 is 20; (2) a second monthly observation frequency of the keyword in January 2013 is 25; (3) a third monthly observation frequency of the keyword in February 2013 is 22; and (4) a fourth monthly observation frequency of the keyword in March 2013 is 29. The modeling module 207 determines that the observation frequency of the keyword has an upward frequency trend based on the first, second, third and fourth monthly observation frequencies.

In one embodiment, the modeling module 207 generates a preference score for each keyword and/or key phrase based on one or more of an observation frequency of the keyword and/or key phrase within a time period, a total observation frequency of the keyword and/or key phrase, a frequency trend of the keyword and/or key phrase, a latest timestamp of the keyword and/or key phrase, and feedback data related to the keyword and/or key phrase. A preference score of a keyword and/or key phrase is data indicating a degree of user preference of the keyword and/or key phrase. For example, a first key phrase marked as a favorite key phrase by the user has a higher preference score than a second key phrase related to a content item skipped by the user. In another example, a first keyword with a more recent timestamp has a higher preference score than a second keyword with an outdated timestamp. In yet another example, a first key phrase with a higher total observation frequency has a higher preference score than a second key phrase with a lower total observation frequency. In yet another example, a first keyword having an upward frequency trend has a higher preference score than a second keyword having a downward frequency trend. In one embodiment, the preference model additionally includes a preference score for each keyword and/or key phrase.

In one embodiment, the modeling module 207 instructs the user interface module 212 to generate graphical data for providing a user interface to the user, allowing the user to modify the preference model via the user interface. For example, the user can provide additional keywords and/or key phrases to the preference model, provide feedback data for keywords and/or key phrases in the preference model, mark one or more keywords and/or key phrases as favorite keywords and/or key phrases, and/or delete one or more keywords and/or key phrases from the preference model via the user interface.

In one embodiment, the modeling module 207 stores the preference model associated with the user in the storage device 243. In another embodiment, the modeling module 207 sends the preference model associated with the user to the search module 208.

The search module 208 can be software including routines for searching content items for a user based on a preference model associated with the user. In some implementations, the search module 208 can be a set of instructions executable by the processor 235 to provide the functionality described below for searching content items for a user based on a preference model associated with the user. In some implementations, the search module 208 can be stored in the memory 237 of the computing device 200 and can be accessible and executable by the processor 235. The search module 208 may be adapted for cooperation and communication with the processor 235 and other components of the computing device 200 via signal line 236.

In one embodiment, the search module 208 receives a request for content items from a user via the controller 202. The search module 208 retrieves a preference model associated with the user from the storage device 243. The search module 208 generates a query for retrieving content items responsive to the user's request. For example, the search module 208 determines one or more featured keywords and/or key phrases from the user's preference model and generates a query that includes the one or more featured keywords and/or key phrases.

A featured keyword or key phrase is a keyword or key phrase representing a feature in the preference model. For example, a featured keyword or key phrase is one of a keyword or key phrase with a recent timestamp, a keyword or key phrase with a total observation frequency greater than a predetermined threshold, a keyword or key phrase with one of the highest total observation frequencies, a keyword or key phrase with an upward frequency trend, a keyword or key phrase with a fluctuant frequency trend, a keyword or key phrase with a downward frequency trend, a keyword or key phrase marked as a favorite keyword by the user, a keyword or key phrase with a positive feedback from the user (e.g., a keyword or key phrase related to content items endorsed or shared by the user), and a keyword or key phrase with a negative feedback from the user (e.g., a keyword or key phrase related to content items marked as disliked items by the user), etc. Other example featured keywords and key phrases are also possible.

In some implementations, the search module 208 determines one or more featured keywords and/or key phrases as one or more of: (1) keywords and/or key phrases that have latest timestamps; (2) keywords and/or key phrases that have highest total observation frequencies; (3) keywords and/or key phrases that have total observation frequencies greater than a predetermined threshold; (4) keywords and/or key phrases that have upward frequency trends; (5) keywords and/or key phrases that have downward frequency trends; (6) keywords and/or key phrases that have fluctuant frequency trends; (7) keywords and/or key phrases that have positive feedback from the user; (8) keywords and/or key phrases that have been marked as favorite keywords and/or key phrases by the user; and/or (9) keywords and/or key phrases that have highest preference scores.

In one embodiment, the search module 208 searches the content database 143 using the query and retrieves one or more content items from the content database 143 based on the user's preference model. For example, the search module 208 searches the content database 143 using one or more featured keywords and/or key phrases included in the query. The search module 208 receives one or more content items from the content database 143, with each content item matching at least one of the featured keywords and/or key phrases. In another example, the search module 208 searches the content database 143 using 10 featured keywords and/or key phrases that have the latest timestamps. The search module 208 retrieves content items from the content database 143, with each content item matching at least one of the 10 featured keywords and/or key phrases. In yet another example, the search module 208 searches the content database 143 based on (1) a first set of featured keywords and/or key phrases having a positive feedback from the user and (2) a second set of featured keywords and/or key phrases having a negative feedback from the user. The search module 208 receives one or more content items from the content database 143, where each content item matches at least one of the first set of featured keywords and/or key phrases and is not related to any featured keyword or phrase from the second set of featured keywords and/or key phrases.

In one embodiment, the search module 208 sends the one or more retrieved content items to the recommendation module 210. In another embodiment, the search module 208 stores the one or more retrieved content items in the storage device 243.

The recommendation module 210 can be software including routines for generating one or more recommended items for a user or a vehicle system. In some implementations, the recommendation module 210 can be a set of instructions executable by the processor 235 to provide the functionality described below for generating one or more recommended items for a user or a vehicle system, such as the mobile computing system 135. In some implementations, the recommendation module 210 can be stored in the memory 237 of the computing device 200 and can be accessible and executable by the processor 235. The recommendation module 210 may be adapted for cooperation and communication with the processor 235 and other components of the computing device 200 via signal line 238.

In one embodiment, the recommendation module 210 receives one or more content items from the search module 208 and generates one or more recommended items for a user or vehicle system from the one or more content items. For example, the recommendation module 210 ranks the one or more content items according to recency of the one or more content items (e.g., the recommendation module 210 ranks the one or more content items according to creation times or publication times of the content items). The recommendation module 210 determines the one or more recommended items as content items that have the highest rankings (e.g., top 10 highest-ranking content items).

In some implementations, the recommendation module 210 generates one or more recommended items based on feedback data provided explicitly or implicitly by the user. For example, if the feedback data indicates the user skipped a first content item related to a first keyword and/or key phrase and endorsed a second content item related to a second keyword and/or key phrase, the recommendation module 210 removes content items related to the first keyword and/or key phrase from the recommended items and adds content items related to the second keyword and/or key phrase to the recommended items.

Figure 7A:
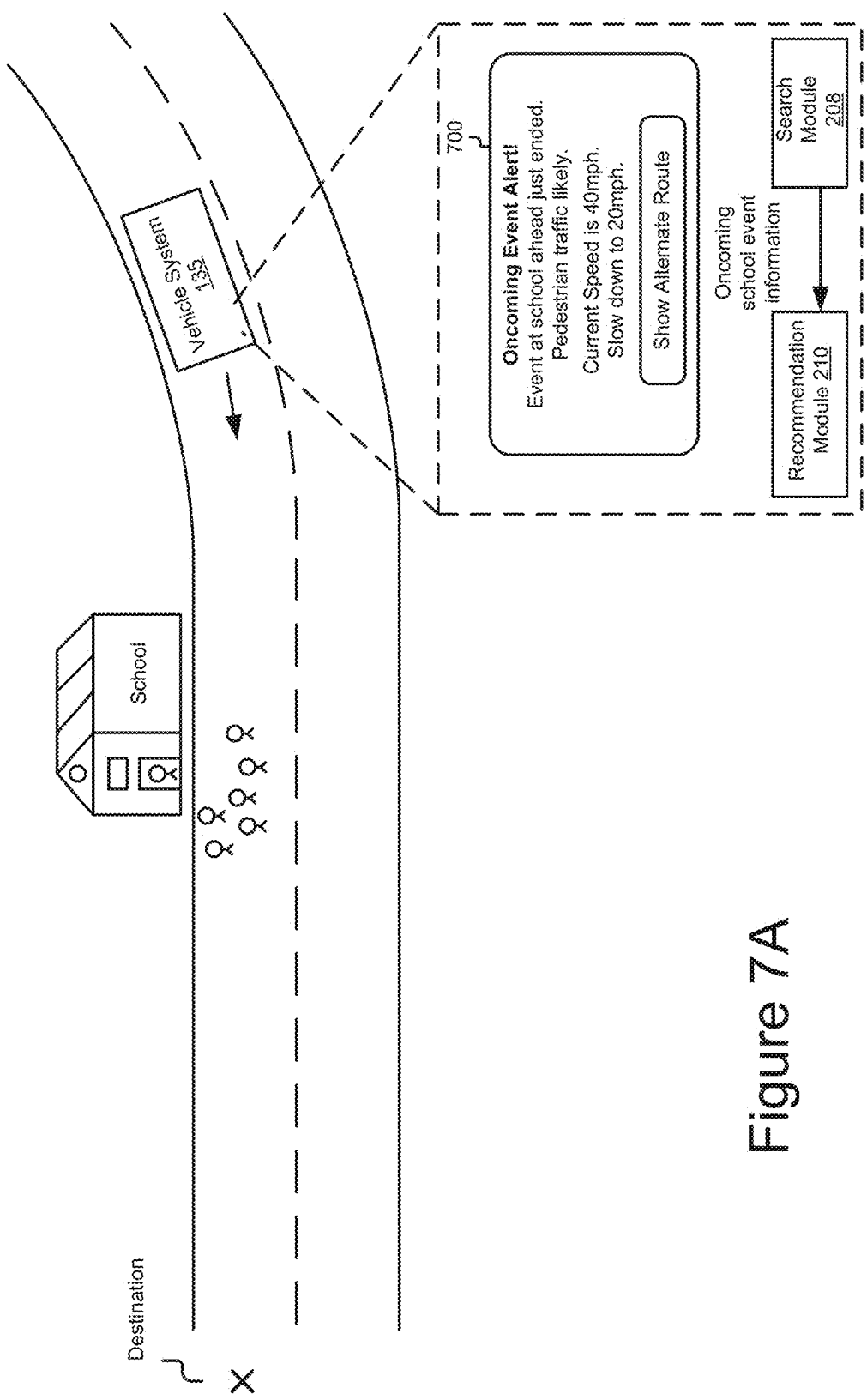
FIGS. 7A and 7B are graphic representations depicting an example event alert and an alternate route suggestion, respectively.
Figure 7B:
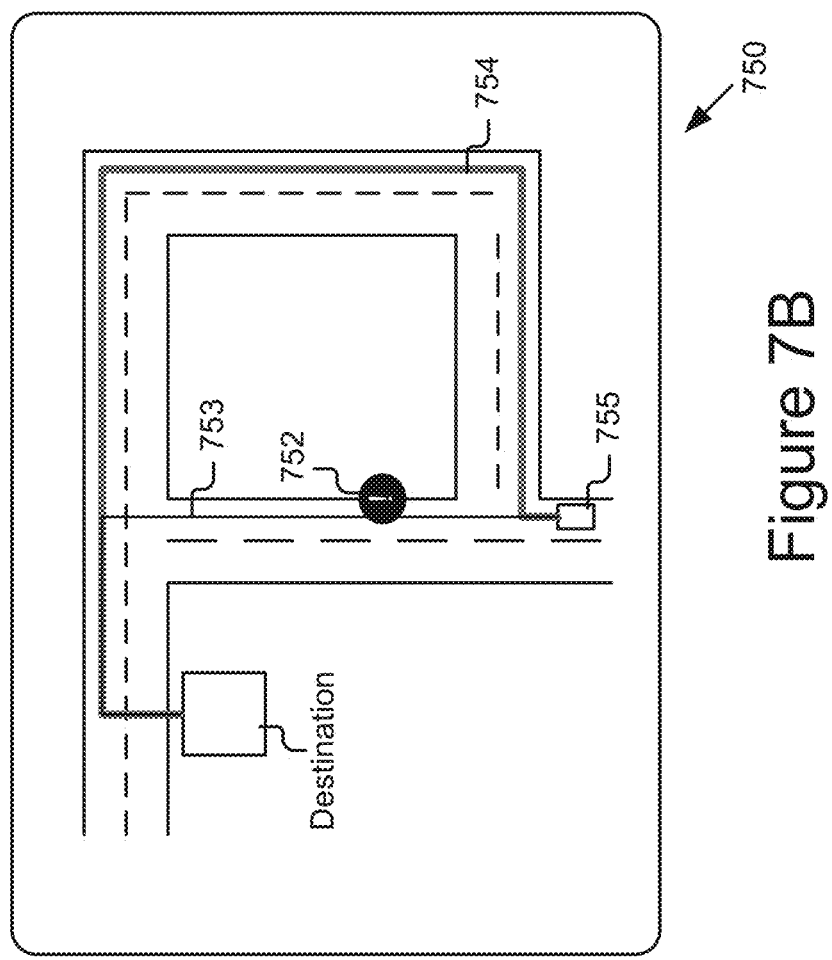

In one embodiment, the recommendation module 210 and the search module 208 cooperates to provide recommended items to the user and/or vehicle system in a timely manner. For example, the search module 208 automatically searches for content items related to a current event (e.g., a natural disaster, an ongoing political event, etc.) in near real time and the recommendation module 210 timely provides the search result to the user and/or vehicle system. For example, as shown in FIG. 7A, a user driving a vehicle system 135 (e.g., a car) at 40 mph is provided with a notification 700 generated by the recommendation module 210 based on the search module 208 automatically searching and providing to the recommendation module 210 information about an oncoming school event located en-route to the user's destination. The recommendation module 210 receives this information and generates the notification 700 to alert the user about the event and recommend that the user reduce the car's speed to 20 mph for safety. In a further example, the recommendation module 210 may be configured to generate an alternate route suggestion 750 (see FIG. 7B) providing the user with an alternate route 754 when an event 752 located on the original route 753 is identified. This allows the user 755 to avoid any traffic congestion caused by the event 752. In some instances, the suggestion 750 may be displayed to the user 755 responsive to receiving a "show alternate route" confirmation from the user (e.g., see 710 in FIG. 7A).

The recommendation module 210 provides the one or more recommended items to the user and/or the vehicle system (e.g., the mobile computing system 135). For example, the recommendation module 210 instructs the user interface module 212 to generate graphical data for providing a user interface that depicts the one or more recommended items to the user. In another example, the recommendation module 210 automatically delivers the recommended items to the user device 115 or the mobile computing system 135 operated by the user. For example, the recommended module 210 automatically delivers the recommended items to a vehicle when the user is driving the vehicle. In some implementations, the recommendation module 210 stores the recommended items in the storage 243.

The feedback module 211 can be software including routines for processing feedback data received from a user. In some implementations, the feedback module 211 can be a set of instructions executable by the processor 235 to provide the functionality described below for processing feedback data received from a user. In some implementations, the feedback module 211 can be stored in the memory 237 of the computing device 200 and can be accessible and executable by the processor 235. The feedback module 211 may be adapted for cooperation and communication with the processor 235 and other components of the computing device 200 via signal line 240.

In one embodiment, the feedback module 211 receives feedback data associated with one or more recommended items. Feedback data is data describing user interactions with recommended items. The user interactions can be explicit interactions or implicit interactions. For example, the feedback data indicates the user has shared a recommended item with friends in a social network, the user has listened to a recommended audio program 3 times, the user has pointed to or hovered over a recommended item using a mouse and/or the user has skipped a recommended talk show, etc. Other example feedback data is possible.

In one embodiment, the feedback data describes a positive feedback related to one or more keywords and/or key phrases. For example, the feedback data indicates the user has marked a recommended item related to a keyword as a favorite item, the user has endorsed or shared a recommended item related to a keyword and/or the user has saved a recommended item related to a keyword for later review, etc. In another embodiment, the feedback data describes a negative feedback related to one or more keywords and/or key phrases from the user. For example, the feedback data indicates the user has marked a recommended item related to a keyword as a disliked item and/or the user has skipped a recommended item related to a keyword. In yet another embodiment, the feedback data includes a positive feedback and a negative feedback related to a set of keywords and/or key phrases.

In one embodiment, the feedback module 211 refines the user's preference model based on the feedback data. For example, if the feedback data indicates the user has skipped a recommended item related to a keyword, the feedback module 211 marks the corresponding keyword in the user's preference model and decreases the preference score associated with the corresponding keyword. In another example, if the feedback data indicates the user has endorsed a recommended item related to a key phrase, the feedback module 211 marks the corresponding key phrase in the user's preference model and increases the preference score associated with the key phrase. The feedback module 211 may store the feedback data in the user's preference model. In one embodiment, the feedback module 211 updates the recommended items for the user based on the feedback data.

The user interface module 212 can be software including routines for generating graphical data for providing user interfaces to users. In some implementations, the user interface module 212 can be a set of instructions executable by the processor 235 to provide the functionality described below for generating graphical data for providing user interfaces to users. In some implementations, the user interface module 212 can be stored in the memory 237 of the computing device 200 and can be accessible and executable by the processor 235. The user interface module 212 may be adapted for cooperation and communication with the processor 235 and other components of the computing device 200 via signal line 242.

In one embodiment, the user interface module 212 generates graphical data for providing a user interface to a user. The user interface module 212 sends the graphical data to the user device 115 or the mobile computing system 135, causing the user device 115 or the mobile computing system 135 to present the user interface to the user. In some instances, the user interface presents one or more recommended items to the user, allowing the user to interact with the one or more recommended items via the user interface. For example, the user can skip a recommended item, mark a recommended item as a favorite item or endorse the recommended item via the user interface. The user can provide other feedback data via the user interface including comments, suggestions, ratings, etc. In some instances, the user interface allows the user to manage a preference model associated with the user. For example, the user can modify the keywords and/or key phrases included in the preference model via the user interface. The user interface module 212 may generate graphical data for providing other user interfaces to users.

Methods

Figure 3:
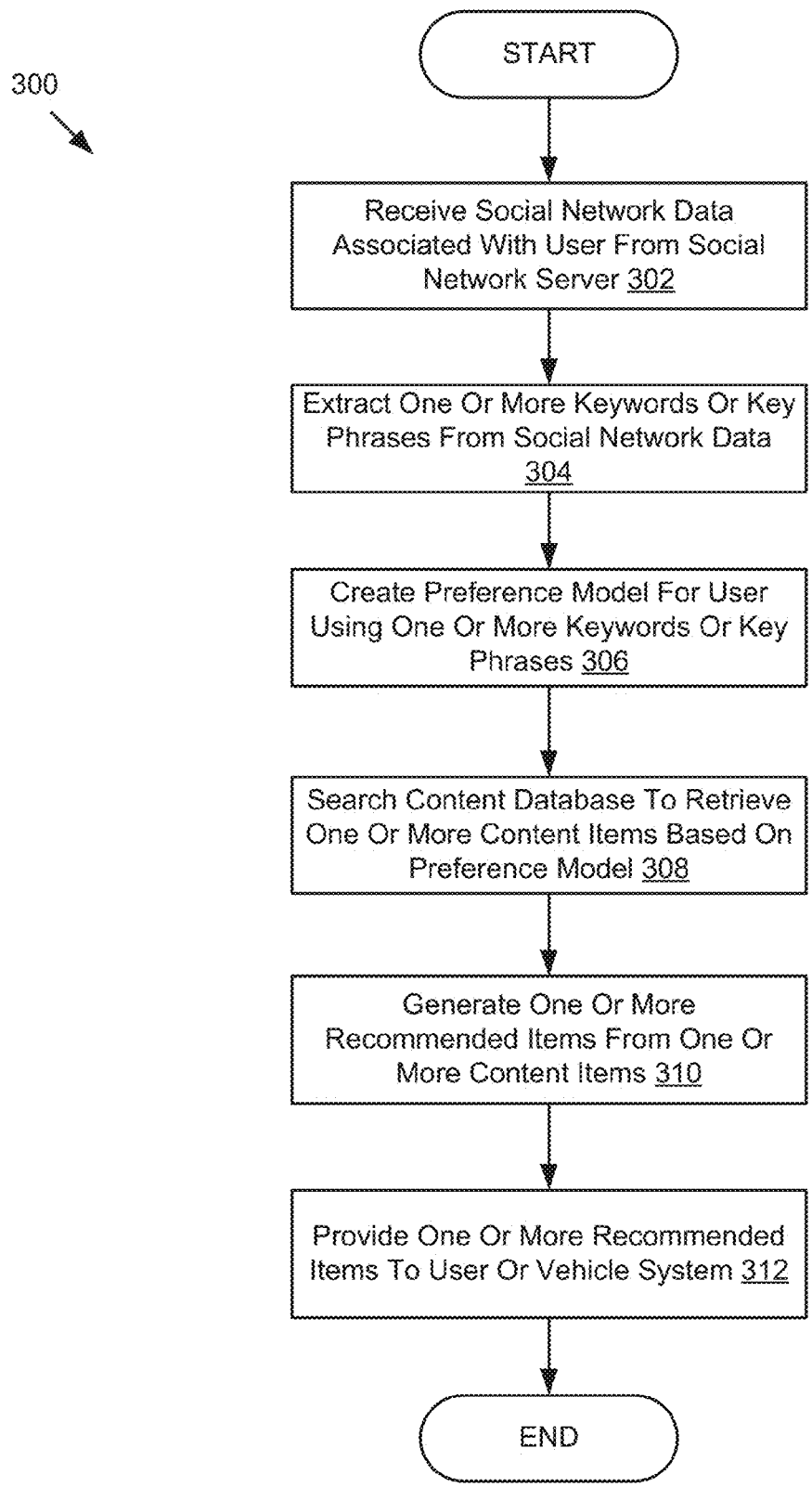
FIG. 3 is a flowchart of an example method for providing recommended content items to a user or a vehicle system.

FIG. 3 is a flowchart of an example method 300 for providing recommended items for presentation to a user for processing by a vehicle system. In one embodiment, the controller 202 receives 302 social network data associated with the user from the social network server 101. The extraction module 206 extracts 304 one or more keywords and/or key phrases from the social network data. The modeling module 207 creates 306 a preference model for the user using the one or more keywords and/or key phrases. The search module 208 searches 308 the content database 143 to retrieve one or more content items based on the preference model. The recommendation module 210 generates 310 one or more recommended items from the one or more content items. The recommendation module 210 provides 312 the one or more recommended items for presentation to the user for processing by the vehicle system.

To further illustrate, in one example the vehicle system 135 may be an autonomous vehicle system that automatically receives recommended items from the recommendation module 210 and processes/interprets the items to control various aspects of the vehicle. For instance, the vehicle system 135 can use the items when determining a route to take, determining the media to play in the vehicle, determining adjustments to the climate control, communicating and/or interacting with one or more passengers, etc.

Figure 4A:
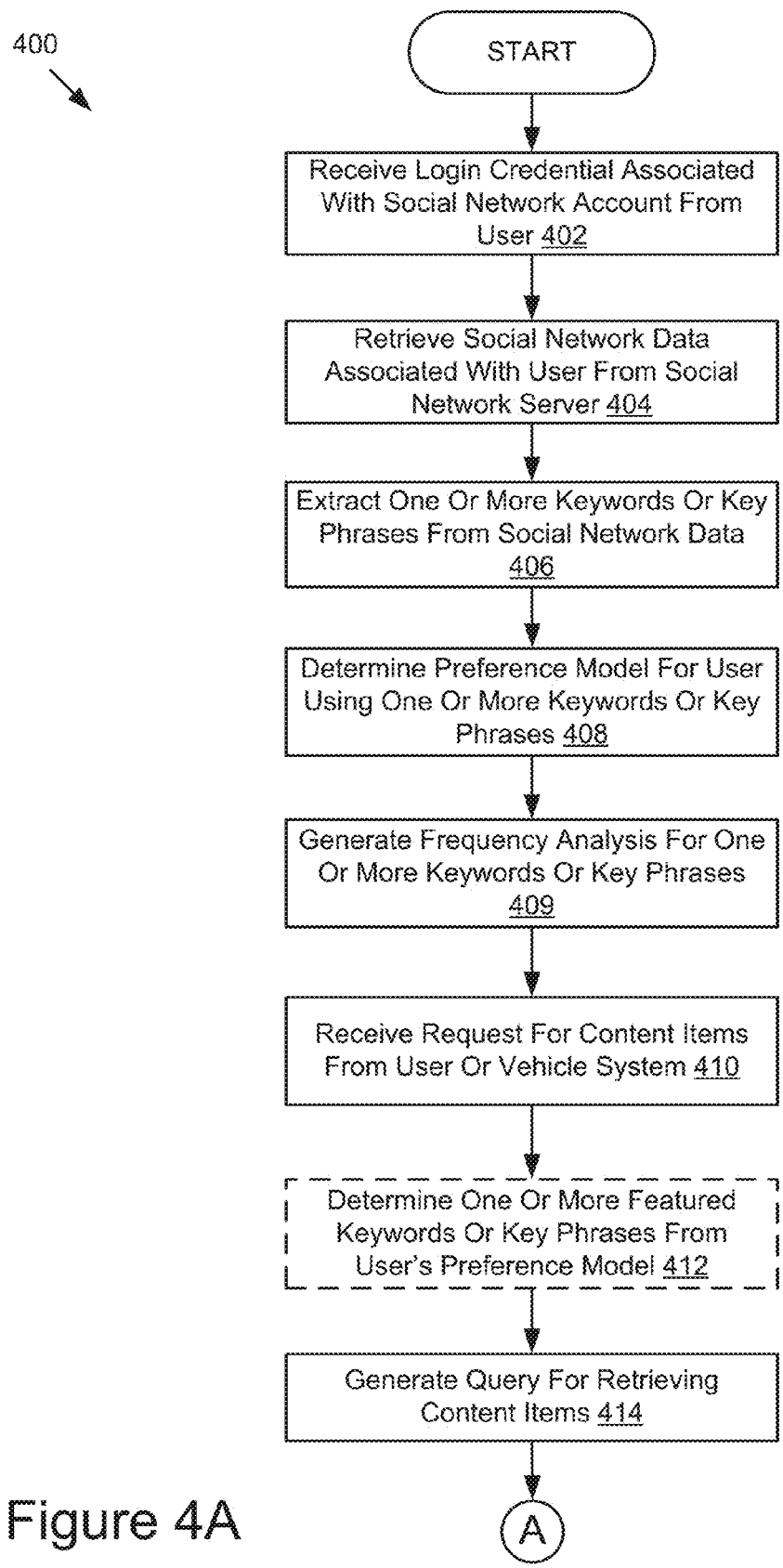
FIGS. 4A and 4B are flowcharts of another example method for providing recommended content items to a user or a vehicle system.
Figure 4B:
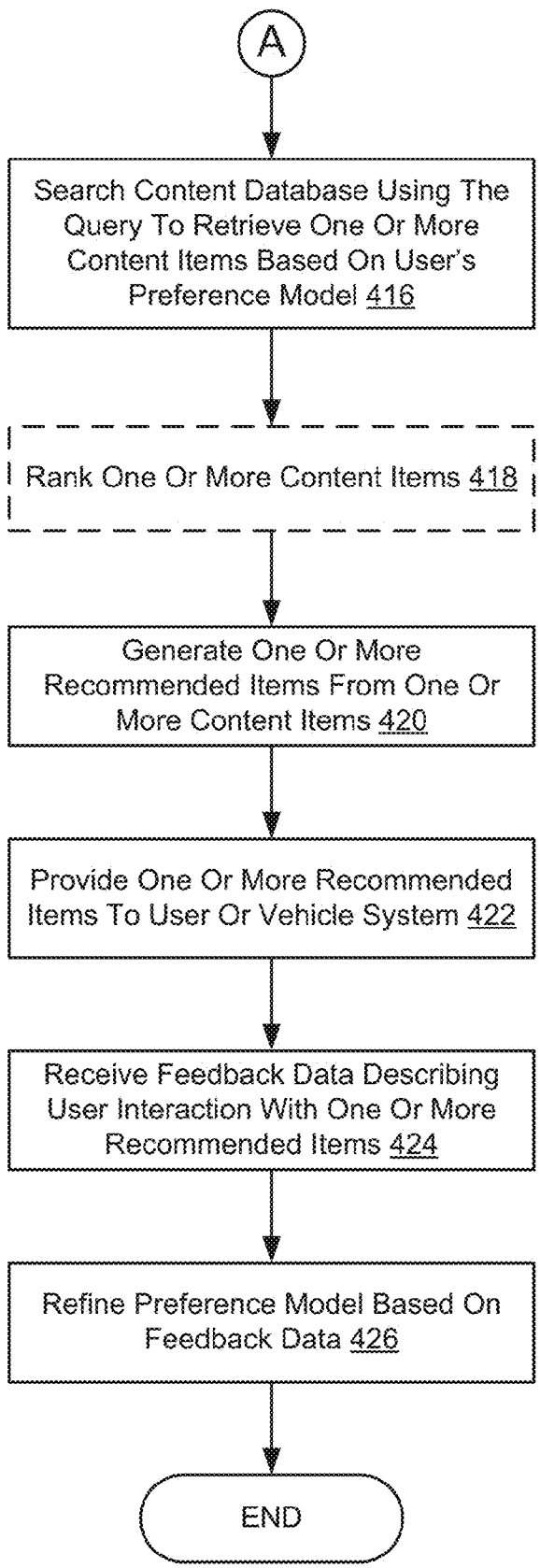

FIGS. 4A and 4B are flowcharts of another example method 400 for providing recommended items for presentation to a user and/or processing by a vehicle system. Referring to FIG. 4A, in one embodiment the controller 202 receives 402 a login credential associated with a social network account from the user. The retrieval module 204 retrieves 404 social network data associated with the user from the social network server 101 using the login credential. The extraction module 206 extracts 406 one or more keywords or key phrases from the social network data. The modeling module 207 determines 408 a preference model for the user using the one or more keywords and/or key phrases. The modeling module 207 generates 409 a frequency analysis for the one or more keywords and/or key phrases. The controller 202 receives 410 a request for content items. The request may be received at the prompting of the user, a vehicle system, or another entity. In some cases, the search module 208 determines 412 one or more featured keywords or key phrases from the user's preference model. The search module 208 generates 414 a query for retrieving content items from the content database 143.

Referring to FIG. 4B, the search module 208 searches 416 the content database 143 using the query to retrieve one or more content items based on the user's preference model. In some cases, the recommendation module 210 ranks 418 the one or more content items. The recommendation module 210 generates 420 one or more recommended items from the one or more content items. The recommendation module 210 provides 422 the one or more recommended items for presentation to the user or for processing and/or interpretation by the vehicle system. The controller 202 receives 424 feedback data describing one or more user interactions with the one or more recommended items. The feedback data may be input by the user into a computing device, such as an interface of a vehicle or computer, and provided to the controller 202, may be generated and provided by a vehicle system 135 to the controller 202, etc. The feedback module 211 refines 426 the preference model based on the feedback data.

Graphic Representations

FIG. 5 is a graphic representation 500 illustrating data included in an example preference model according to one embodiment. The example preference model includes 2 keywords and 1 key phrase, a total observation frequency for each keyword and the key phrase, a latest timestamp associated with each keyword and the key phrase, a frequency trend for each keyword and the key phrase, and feedback data associated with each keyword and the key phrase.

FIGS. 6A-6C are graphic representations 600, 630, 650 illustrating various frequency trends for various keywords according to one embodiment. Referring to FIG. 6A, the graphic representation 600 depicts 5 observation frequencies for the keyword "Museum" at 5 non-overlapped time periods. The illustrated observation frequencies indicate that the keyword "Museum" is associated with an upward frequency trend.

Referring to FIG. 6B, the graphic representation 630 depicts 5 observation frequencies for the key phrase "Cooking Class" at 5 non-overlapped time periods. The illustrated observation frequencies indicate that the key phrase "Cooking Class" is associated with a downward frequency trend.

Referring to FIG. 6C, the graphic representation 650 depicts 5 observation frequencies for the keyword "News" at 5 non-overlapped time periods. The illustrated observation frequencies indicate that the keyword "News" is associated with a fluctuant frequency trend.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
retrieving social network data associated with a user;
extracting one or more of a keyword and a key phrase from the social network data;
determining a preference model that includes a frequency analysis associated with the one or more of the keyword and the key phrase, the frequency analysis indicating how often the one or more of the keyword and the key phrase are observed in the social network data;
receiving a request for content data;
searching a content database to retrieve one or more content items based on the frequency analysis associated with the preference model;
generating one or more recommended items for the user or for a vehicle system from the one or more content items; and
providing the one or more recommended items for presentation to the user or for processing by the vehicle system.

2. The method of claim 1, wherein searching the content database to retrieve the one or more content items comprises:
determining, based on the frequency analysis, one or more of a featured keyword and a featured key phrase from the preference model; and
searching the content database to retrieve the one or more content items that match at least one of the one or more of the featured keyword and the featured key phrase.

3. The method of claim 2, wherein the one or more of the featured keyword and the featured key phrase are associated with one or more latest timestamps.

4. The method of claim 2, wherein the one or more of the featured keyword and the featured key phrase are associated with one or more highest total observation frequencies.

5. The method of claim 2, wherein the one or more of the featured keyword and the featured key phrase are associated with one or more upward frequency trends.

6. The method of claim 1, wherein the one or more recommended items include one or more of a modified maximum speed and an estimated destination established travel route.

7. The method of claim 1, further comprising:
receiving feedback data describing one or more user interactions with the one or more recommended items; and
refining the preference model based on the feedback data.

8. The method of claim 1, wherein the frequency analysis describes one or more of an observation frequency within a time period for each of the one or more of the keyword and the key phrase that are extracted from the social network data, a total observation frequency for each of the one or more of the keyword and the key phrase that are extracted from the social network data, and a frequency trend for each of the one or more of the keyword and the key phrase that are extracted from the social network data.

9. A system comprising:
one or more processors; and
one or more memories storing instructions that, when executed, cause the system to:
retrieve social network data associated with a user;
extract one or more of a keyword and a key phrase from the social network data;
determine a preference model that includes a frequency analysis associated with the one or more of the keyword and the key phrase, the frequency analysis indicating how often the one or more of the keyword and the key phrase are observed in the social network data;
receive a request for content data;
search a content database to retrieve one or more content items based on the frequency analysis associated with the preference model;
generate one or more recommended items for the user or for a vehicle system from the one or more content items; and
provide the one or more recommended items for presentation to the user or for processing by the vehicle system.

10. The system of claim 9, wherein the instructions when executed cause the system to search the content database to retrieve the one or more content items by:
determining, based on the frequency analysis, one or more of a featured keyword and a featured key phrase from the preference model; and
searching the content database to retrieve the one or more content items that match at least one of the one or more of the featured keyword and the featured key phrase.

11. The system of claim 10, wherein the one or more of the featured keyword and the featured key phrase are associated with one or more latest timestamps.

12. The system of claim 10, wherein the one or more of the featured keyword and the featured key phrase are associated with one or more highest total observation frequencies.

13. The system of claim 10, wherein the one or more of the featured keyword and the featured key phrase are associated with one or more upward frequency trends.

14. The system of claim 9, wherein the one or more recommended items include one or more of a modified maximum speed and an estimated destination established travel route.

15. The system of claim 9, wherein the instructions when executed cause the system to also:
receive feedback data describing one or more user interactions with the one or more recommended items; and
refine the preference model based on the feedback data.

16. The system of claim 9, wherein the frequency analysis describes one or more of an observation frequency within a time period for each of the one or more of the keyword and the key phrase that are extracted from the social network data, a total observation frequency for each of the one or more of the keyword and the key phrase that are extracted from the social network data, and a frequency trend for each of the one or more of the keyword and the key phrase that are extracted from the social network data.

17. A computer program product comprising a non-transitory computer usable medium including a computer readable program, wherein the computer readable program when executed on a computer causes the computer to:
retrieve social network data associated with a user;
extract one or more of a keyword and a key phrase from the social network data;
determine a preference model that includes a frequency analysis associated with the one or more of the keyword and the key phrase, the frequency analysis indicating how often the one or more of the keyword and the key phrase are observed in the social network data;
receive a request for content data;
search a content database to retrieve one or more content items based on the frequency analysis associated with the preference model;

generate one or more recommended items for the user or for a vehicle system from the one or more content items; and provide the one or more recommended items for presentation to the user or for processing by the vehicle system.

18. The computer program product of claim 17, wherein searching the content database to retrieve the one or more content items comprises:

determining, based on the frequency analysis, one or more of a featured keyword and a featured key phrase from the preference model; and searching the content database to retrieve the one or more content items that match at least one of the one or more of the featured keyword and the featured key phrase.

19. The computer program product of claim 18, wherein the one or more of the featured keyword and the featured key phrase are associated with one or more latest timestamps.

20. The computer program product of claim 18, wherein the one or more of the featured keyword and the featured key phrase are associated with one or more highest total observation frequencies.

21. The computer program product of claim 18, wherein the one or more of the featured keyword and the featured key phrase are associated with one or more upward frequency trends.

22. The computer program product of claim 17, wherein the one or more recommended items include one or more of a modified maximum speed and an estimated destination established travel route.

23. The computer program product of claim 17, wherein the computer readable program when executed on the computer cause the computer to also:

receive feedback data describing one or more user interactions with the one or more recommended items; and refine the preference model based on the feedback data.

24. The computer program product of claim 17, wherein the frequency analysis describes one or more of an observation frequency within a time period for each of the one or more of the keyword and the key phrase that are extracted from the social network data, a total observation frequency for each of the one or more of the keyword and the key phrase that are extracted from the social network data, and a frequency trend for each of the one or more of the keyword and the key phrase that are extracted from the social network data.

* * * * *